No. 818,967. PATENTED APR. 24, 1906.
C. F. JENKINS.
AUTOMOBILE STEERING DEVICE.
APPLICATION FILED OCT. 19, 1905.
2 SHEETS—SHEET 1.
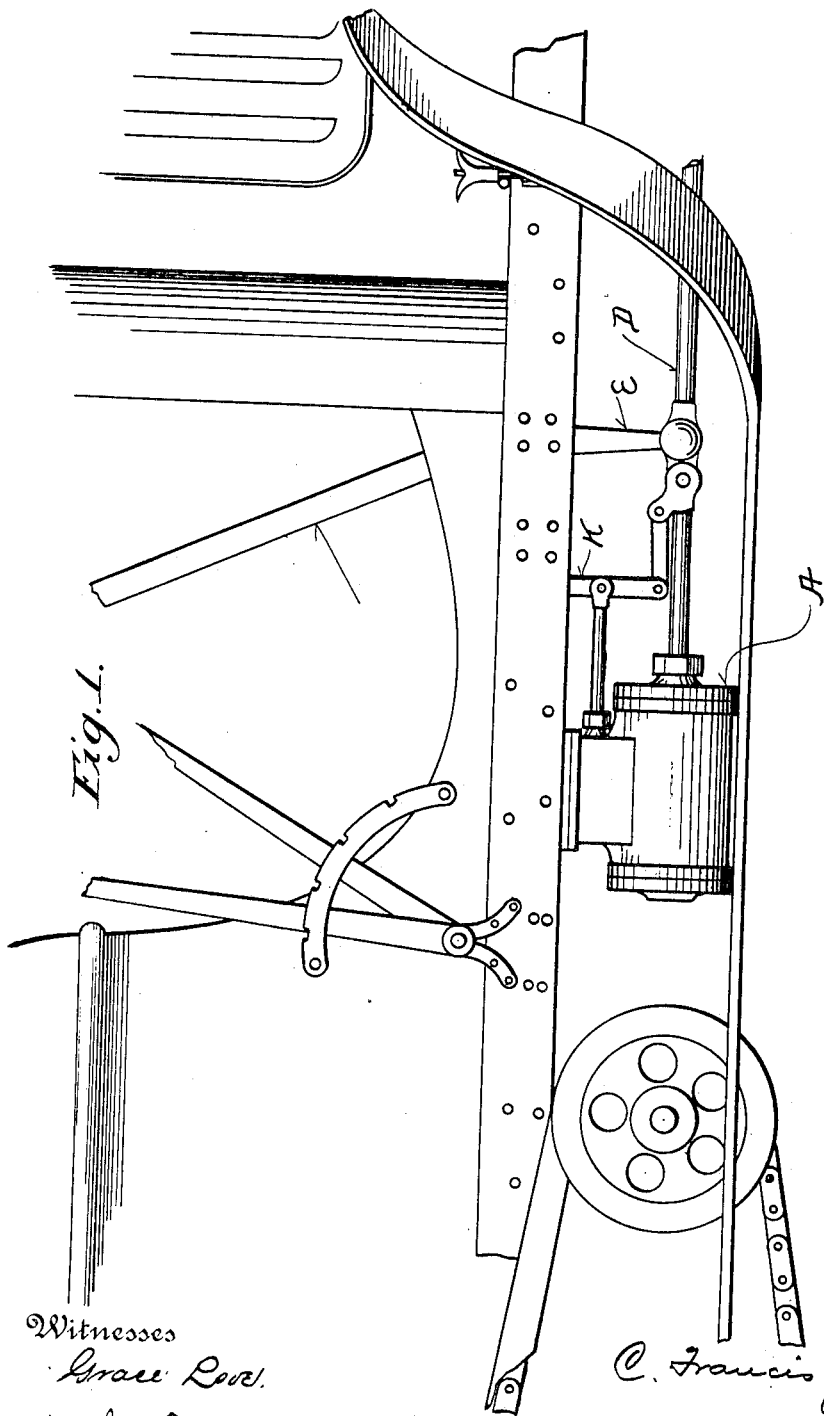

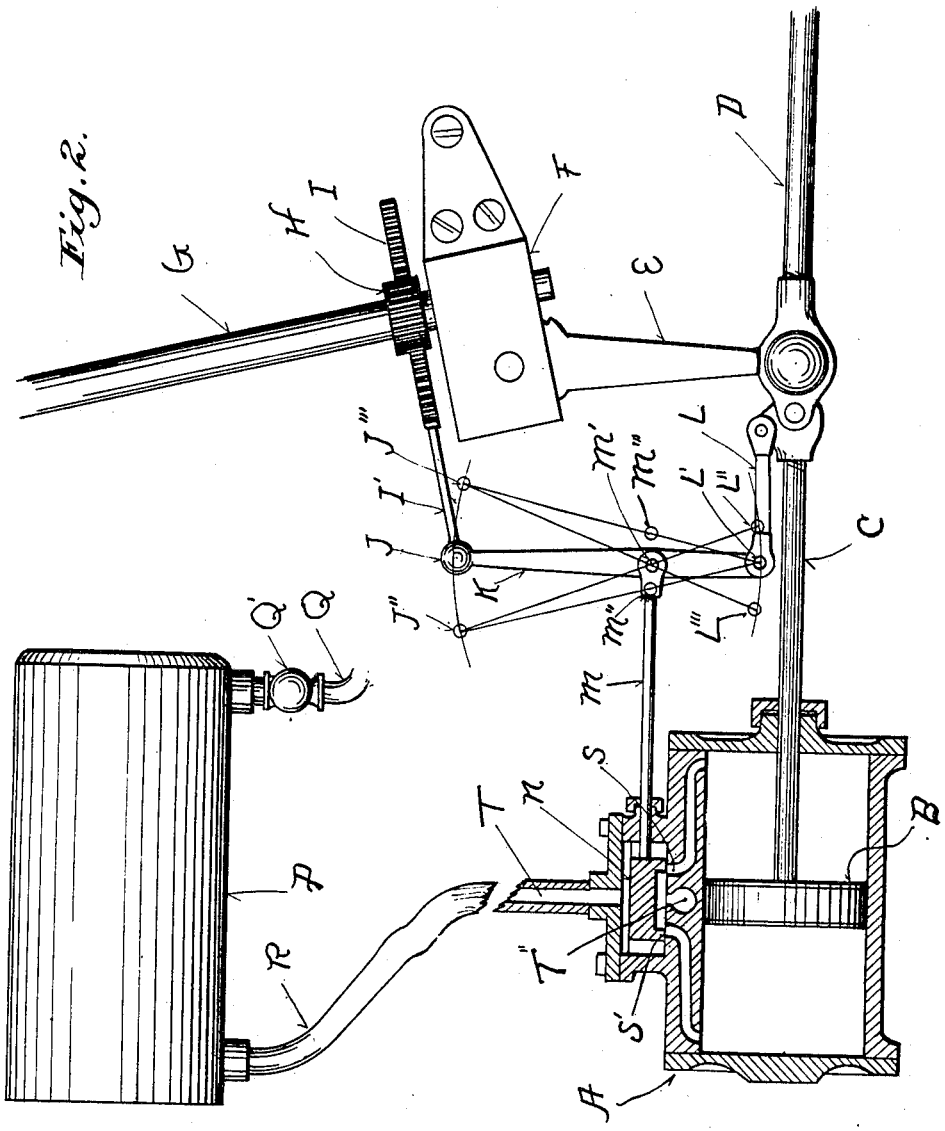

UNITED STATES PATENT OFFICE.

CHARLES FRANCIS JENKINS, OF WASHINGTON, DISTRICT OF COLUMBIA, ASSIGNOR OF ONE-HALF TO CHARLES C. DIEUDONNE, OF WASHINGTON, DISTRICT OF COLUMBIA.

AUTOMOBILE STEERING DEVICE.

No. 818,967.  Specification of Letters Patent.  Patented April 24, 1906.

Application filed October 19, 1905. Serial No. 283,423.

*To all whom it may concern:*

Be it known that I, CHARLES FRANCIS JENKINS, a citizen of the United States, residing at Washington, District of Columbia, have invented certain new and useful Improvements in Automobile Steering Devices, of which the following is a specification.

The object of my invention is to decrease the labor of steering large automobiles and at the same time increase the factor of safety in fast driving. This I accomplish by applying power to the steering.

On occasions—as, for example, driving heavy cars through the crowded streets of a city—it has been found extremely desirable to be able to steer with one hand while shifting the gears with the other and at other times to change the course of the car more quickly than can be done manually.

The present invention permits the instant application of a powerful force to the steering. This is accomplished without cost or loss of power of the engine.

The method employed is disclosed in the following specification and accompanying drawings, in which—

Sheet 1 shows the location of the device attached to the steel frame of a popular type of car, while Sheet 2 shows the construction of the device itself in detail and in partial section, in which A is a cylinder fitted with a piston B, the piston-rod C of which is attached to the present reach-rod D, extending forward to the steering-knuckles of the front wheels. This reach-rod, as is well known, is also attached to the arm E by a ball-and-socket joint controlled by the steering-post G through the worm and gear in the box F. On the steering-post is also located a pinion H, engaging with the rack I, the other end of which is attached through the socket-joint J to the arm K. This arm or lever is attached at the opposite end to the link L, connecting it with the knuckle of the piston-rod C. Near its middle the lever J is attached to the valve-rod M, controlling the movement of the valve N.

P is a tank in which pressure is accumulated from the exhaust to which it is attached between the engine and the muffler, through the pipe Q and the check-valve Q', which latter prevents a backward escape of the pressure. This pressure may be anything, whether high or low is immaterial, but averages in the various machines probably about fifty pounds.

The operation of the device is as follows: Pressure having accumulated in the tank P acts through the pipe R and the port T' to the cylinder A on both sides of the piston B when the slide-valve is in normal or neutral position. Now because of the slack or lost motion in the steering-gear the steering-post G, through pinion H, rack I, lever J, and valve-rod M, moves the slide-valve N until it uncovers one of the ports—for example, S—putting it in communication with the exhaust T. This lets the pressure escape in a measure from the right end of the cylinder, and the piston moves over toward that end, turning the front wheels of the car. This carries with it the lever K and thus reëstablishes the slide-valve N in its neutral position, allowing the pressure to again equalize in both ends of the cylinder, and consequently the piston comes to rest. It will be readily understood that if the steering-wheel is continuously turned to the left the slide-valve will continue to remain open until the piston has traveled to the end of the cylinder. The behavior of the several parts is therefore as follows: J moves to J'', which moves M' to M'', which opens the port S and allows part of the pressure to escape from that end of the cylinder, and the resultant movement of the piston to the right moves L' to L'', which puts the slide-valve in neutral position, and the pressure on the piston is again equalized, and it at once comes to rest. While these movements have been described in steps, it will be understood that the processes are instantaneously progressive and that the movement of the piston begins practically simultaneously with the movement of the steering-wheel and follows it up until it stops, when the piston instantly stops. It will therefore be seen that each movement is instantaneous and that the piston keeps the steering-gear just ahead of the point where the steering-post would take up the thrust of the steering. It will also be understood that should the power drop to nothing for any reason whatever the driver does not lose control of the machine, the steering simply being then performed in the usual way with the consequent increased labor. Thus the change from power-steering to hand-steering is accomplished without loss of time, without shifting any clutches, gears, or other devices, and without losing control of the machine for a single instant, a feature of the utmost importance. It will also be understood that I simply employ what is now waste energy to give the driver quicker and more positive control of the machine and at the same time decrease the labor of steering.

Of course it will readily be understood that other means than a piston in a cylinder may be employed in steering the automobile without departing from the spirit of my invention, and I do not wish to limit myself to this alone.

What I do claim as my invention, and wish to protect by Letters Patent of the United States, is—

1. The combination, with the running-gear of an automobile, of a suitable power device connected with the steering-wheels, a steering-head connected also with the steering-wheels to turn them in either direction, and means whereby the operation of the steering-head shall automatically throw the power devices into and out of action.

2. The combination of the running-gear of an automobile, of a power device connected with the steering-wheels and means whereby the power may be at will applied to turn the wheels to the right or left.

3. The combination of a steering-post, provided with devices for connecting with the steering-knuckles of an automobile, whereby the turning of the post turns the wheels, of a cylinder for fluid under pressure, a piston in the cylinder also connected with the steering-knuckles, and means whereby the operation of the steering-head to turn the wheels in either direction causes the admission of fluid under pressure to the cylinder compelling the piston to urge the turning of the wheels in the same direction.

4. The combination of the running-gear of an automobile, of a cylinder for fluids under pressure, a piston in the cylinder connected with the steering-knuckles, and means for admitting pressure to the cylinder.

5. The combination of the running-gear of an automobile, of a cylinder for fluid under pressure, a piston in said cylinder connected with the steering-wheels, a steering-post with a pinion mounted thereon, the pinion enmeshing with a rack connected to a lever controlling the admission of the fluid to the cylinder to turn the wheels to the right or left.

In testimony whereof I have affixed my signature in presence of two witnesses.

CHAS. FRANCIS JENKINS.

Witnesses:
   J. JEROME LIGHTFOOT,
   JAMES L. CRAWFORD.